United States Patent [19]

Virolleau et al.

[11] 4,281,263

[45] Jul. 28, 1981

[54] HYBRID STATOR AND A TWO-AXIS INDUCTION ELECTRIC MOTOR CONSTRUCTED THEREWITH

[75] Inventors: Alain F. Virolleau, Paris; Michel Kant, Thourotte; Pierre H. Burnier, Longjumeau, all of France

[73] Assignee: Gradient, Compiegne, France

[21] Appl. No.: 41,301

[22] Filed: May 22, 1979

[30] Foreign Application Priority Data

May 23, 1978 [FR] France .................. 78 15304
Jun. 30, 1978 [FR] France .................. 78 19613

[51] Int. Cl.³ .......................................... H02K 7/06
[52] U.S. Cl. .................................. 310/13; 318/115; 318/135
[58] Field of Search .............. 318/115, 138, 35–38; 310/12–14, 49

[56] References Cited

U.S. PATENT DOCUMENTS

| 3,155,851 | 11/1964 | Francis ........................ 310/13 |
| 3,376,441 | 4/1968 | Martin et al. ................ 310/13 |
| 3,441,819 | 4/1969 | Palmero ...................... 318/115 |
| 3,602,745 | 8/1971 | Davis .......................... 310/13 |
| 3,852,627 | 12/1974 | Davis .......................... 310/13 |
| 3,860,839 | 1/1975 | Buchberger et al. .......... 310/12 |
| 3,869,625 | 3/1975 | Sawyer ..................... 318/115 X |
| 3,889,165 | 6/1975 | Van ........................... 318/115 |
| 4,099,106 | 7/1978 | Nikaido ...................... 318/115 |
| 4,197,488 | 4/1980 | Kant ........................... 318/115 |

FOREIGN PATENT DOCUMENTS 851773 1/1940 France .
2041129 1/1971 France .

*Primary Examiner*—Donovan F. Duggan
*Attorney, Agent, or Firm*—Cushman, Darby & Cushman

[57] ABSTRACT

A tubular stator capable of creating a magnetic field having both linear and rotary components comprises a tubular magnetic frame formed from longitudinal magnetic elements which are angularly spaced. The magnetic elements have teeth which extend radially inwardly. Circular induction coils are disposed between the teeth and undulating coils are disposed longitudinally between the magnetic elements. A magnetic sleeve surrounds the magnetic frame.

An electric motor comprises a cylindrical rotor mounted within the tubular stator so as to be rotatable and translatable.

11 Claims, 4 Drawing Figures

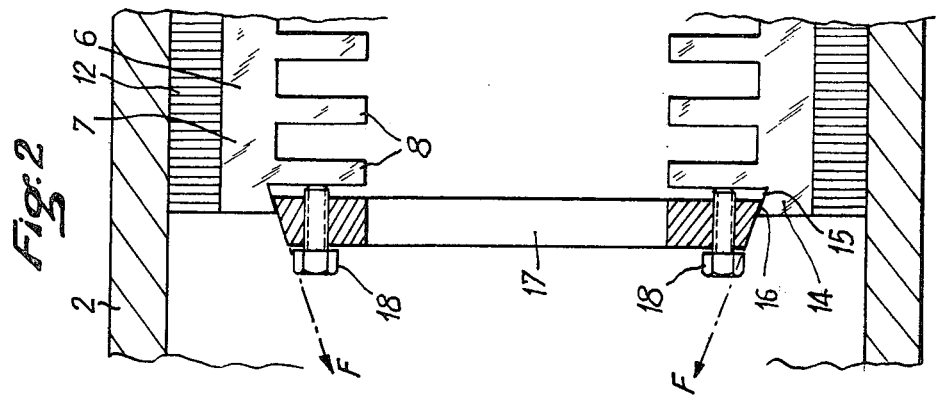
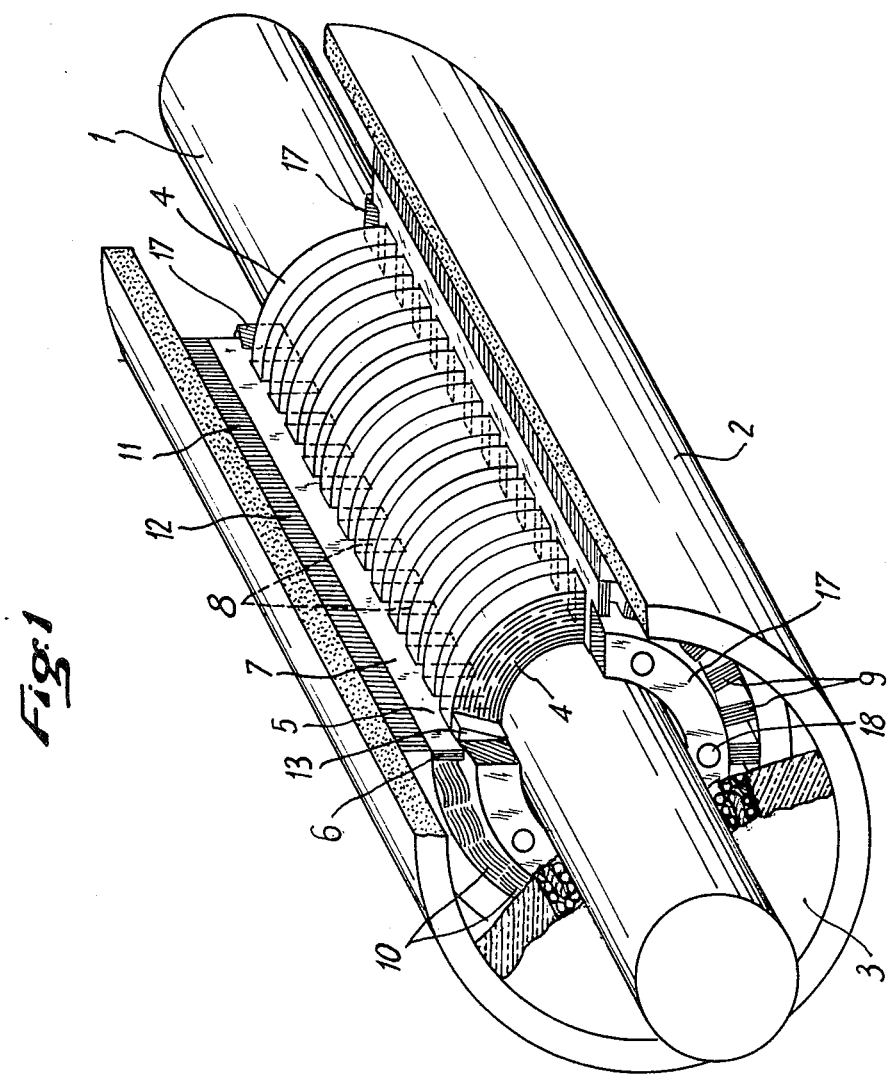

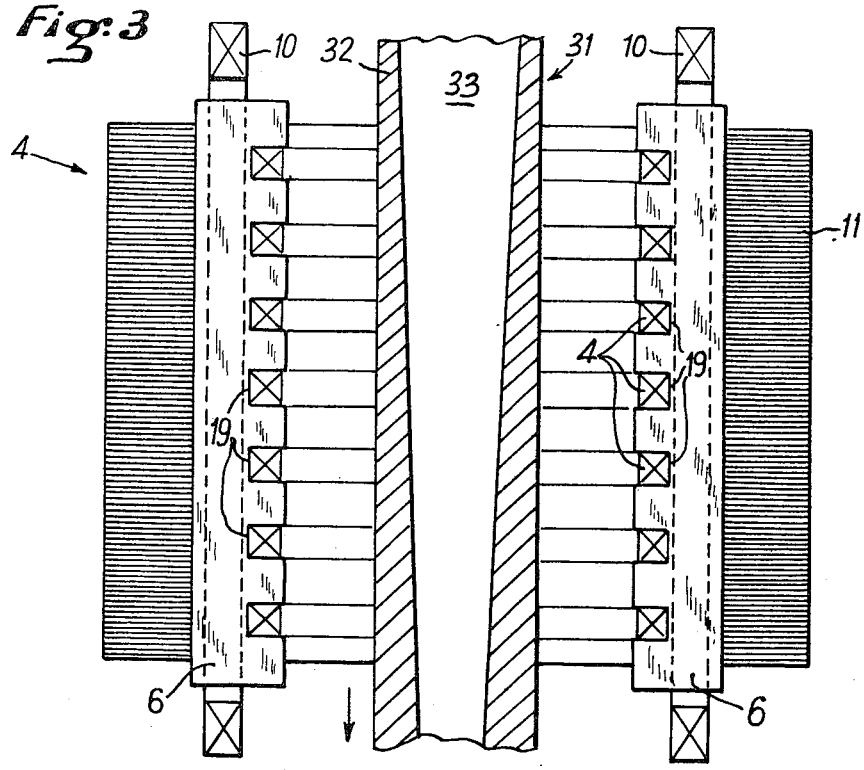
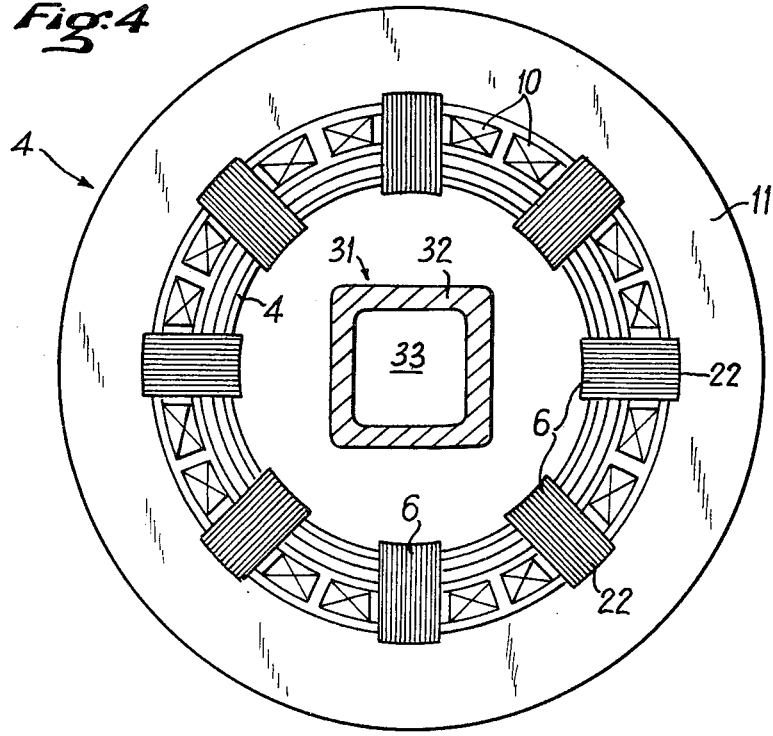

HYBRID STATOR AND A TWO-AXIS INDUCTION ELECTRIC MOTOR CONSTRUCTED THEREWITH

FIELD OF THE INVENTION

The present invention relates to a stator capable of creating a magnetic field having both a rotary and a linear component, and thus making it possible to produce a hybrid electric motor having two directions of movement, one rotational and the other translational, or else making it possible to produce an electrodynamic liquid stirring device by creating a helicoidal resultant field.

Numerous mechanical driving and positioning devices have the object of rotationally driving and linearly displacing mechanical means having two degrees of liberty, one in rotation and the other in linear displacement along the axis of rotation. These mechanisms require a complex combination of a plurality of motors, either rotary or linear, and of transmissions in the form of complex linkages subject to derangement.

It is moreover known that rotational movements of liquid metal inside an ingot mould can be achieved by applying a rotary electromagnetic field, or that movements of translation can be achieved by applying linear electromagnetic fields.

One aim of the present invention is to propose a novel motor enabling a circular movement and a linear movement to be imparted to an object, while the stator designed for this motor can also to applied to the electrodynamic stirring of liquids.

SUMMARY OF THE INVENTION

According to the present invention there is provided a tubular stator capable of creating a magnetic field having a linear component and a rotary component, comprising:

a tubular magnetic frame divided into longitudinal magnetic elements spaced angularly apart at least peripherally and having a comb-like radial profile whose teeth are directed radially towards the centre, a tubular winding having circular induction coils which are disposed between the teeth of the longitudinal magnetic elements, undulating coil bunches disposed longitudinally between the longitudinal magnetic elements and surrounding the circular induction coils, and a magnetic sleeve surrounding the magnetic frame.

A stator of the invention has a rotating flux generated by the asynchronous inductor comprising conventional undulating coil bunches, this rotating flux inducing a resultant torque on the rotor or on the liquid which is to be stirred. Simultaneously or separately in terms of time it is also possible to obtain a sliding flux produced by the asynchronous tubular winding which induces a resultant force directed along its axis.

It can be seen that the stator of the invention has in fact two inductors combined on a single frame in a completely novel manner, namely a tubular inductor whose cores are the teeth of the magnetic elements and whose yokes are the straight branches of these elements, and an inductor comprising undulating coil bunches whose cores are the aforesaid straight branches of the magnetic elements. A single hybrid inductor is in fact obtained which at will produces a rotary field, a linear or sliding field, or else a helicoidal field.

In a preferred embodiment each longitudinal magnetic element is composed of a laminated stack of comb-like sheets. This embodiment, which in itself does not depart from the usual structure of the frame of a sliding field linear motor, is easier to apply than with conventional linear motors, because in the motor of the invention there is no longer any problem of incompatibility between the laminated structure and its radial arrangement over a circle of 360°. Artifices of the type described in French Pat. No. 2,202,394 consequently do not have to be employed.

In a preferred embodiment of the invention the magnetic sleeve is composed on a laminated stack of flat sheets in the form of annular discs. In this manner losses through Foucault currents are considerably reduced. Because of the crossing of the longitudinal sheets of the longitudinal magnetic elements with the transverse laminations of the sleeve surrounding them, excellent concentration of the resultant flux is achieved, and this flux is then able to move in both directions.

In order to ensure that the stator will not be subjected to deforming forces, according to the invention the longitudinal magnetic elements are held angularly apart from one another by means of wedges disposed in the spaces bounded circularly by the teeth of the two successive longitudinal magnetic elements, radially by the airgap and the bunches of the winding comprising longitudinal bunches, and longitudinally by two successive coils of the tubular winding.

It is advantageous for the longitudinal magnetic elements and the sleeve to be in close mutual contact.

In an advantageous embodiment the rotor, which is a tube of soft iron, is coated with a deposite of copper protected by a hard coating, such as hard chromium.

BRIEF DESCRIPTION OF THE DRAWINGS

Embodiments of the present invention will hereinafter be described, solely by way of example, with reference to the accompanying drawings, in which:

FIG. 1 is an exploded view of an electric motor according to the invention,

FIG. 2 shows a detail in the method of assembly on the motor shown in FIG. 1,

FIG. 3 shows in longitudinal section a diagrammatic view of a stator according to the invention which is used for the electromagnetic stirring of a billet or bloom in the course of continuous casting, and FIG 4 shows diagrammatically a cross-section of the stator of FIG. 3.

DESCRIPTION OF PREFERRED EMBODIMENTS

The electric motor shown in FIG. 1 comprises an armature formed of a straight tube 1 of soft iron, which is disposed along the axis of a cylindrical frame 2 at the ends of which it rests on two ball corridor bearings 3, of which for the sake of clarity in the drawing only one is shown in an exploded view. In the two bearings 3 the tube 1 has two degrees of liberty, respectively in translation along its axis and in rotation about its axis.

A first tubular winding directly surrounds the tube 1 which forms the armature of a linear induction motor. In fact, a plurality of induction windings 4 are wound concentrically of the axis of the tube 1 and are spaced apart from one another by the teeth 8 of a magnetic frame 5 formed by the juxtaposition of flat comb-shaped sheets 6 whose branches 7 surmount the windings 4. So far the structural elements of a conventional linear motor can be recognised. However, unlike a conventional linear motor, the flat comb-shaped sheets 6 are disposed in bundles 9 distributed with regular angular spacings. The regular intervals between the bundles of sheets 9 receive bunches 10 of a second undulating winding, of which they constitute the magnetic cores. For the sake of clarity in the drawing, only some of the winding heads of the undulating winding are shown. A sleeve 11 composed of a stack of flat annular sheets 12 is in close clamped contact with the peripheral surface of the assembly of bundles 9 of flat sheets 6.

Since the space between bundles 9 of sheets 6 is of practical use only for housing the bunches 10, this is advantageous to the linear movement, but is extremely disadvantageous for the rotary movement, so that it is necessary to provide wedges 13, of which mention will be made later on, which are of magnetic material.

With a single armature, namely the tube 1, two inductors are thus obtained in a single stator; namely a linear motor inductor formed by the tubular winding consisting of coils 4 and the frame of sheets 6 in which a sliding magnetic flux is generated inducing an axial force of translation on the tube 1; and a rotary motor inductor composed of the winding comprising undulating winding bunches 10 disposed between the branches of the bundles 9 of combs and the aforesaid bundles of sheets which constitute cores of a frame in which is generated a rotating magnetic flux channeled by the annular sheets 12 which serve as yokes and which through their laminated configuration reduce Foucault current losses.

Before proceeding further with the description, the following advantages of the invention will be pointed out.

The first advantage is that the rotating flux cannot, because of the geometry, generate induced currents in the untoothed portion of the sheets 6.

Another advantage is that the construction proposed according to the invention makes it possible to use magnetic sheets having crystals directed in the radial direction for the sheets 6, in order to increase the power-to-weight ratio of the motor by increasing the flux in the teeth 8.

Another advantage is that it is easy to drill and grind the interior of the cylinder composed of the stack of assembled sheets 12, in order to reduce the "static air-gap" between inductors and armature so as to increase the rotating flux.

In order to ensure the rigidity of the stator, provision is made for wedges 13 of non-magnetic material to be disposed in the spaces bounded circularly by the teeth of two adjacent bundles 9, radially by the air-gap and the bunches 10, and longitudinally by two successive coils 4.

Reference will now be made to FIG. 2, with the aid of which the method of assembly of the motor will now be described.

For this purpose, each of the sheets 6 has at each end, beyond its end tooth 8, an extension 14 of its branch 7. This extension 14 has a step 15 provided with an edge 16 directed outwardly along line F towards a point situated in the extension of the axis of the motor.

In addition, two frustoconical rings 17 are provided, each of which has on its smaller face at least three screws 18 passing right through it, each in a tapped hole.

The coils 4 and the two rings 17, suitably spaced apart are disposed on an assembly mandrel with the smaller faces of the rings 17 facing outwardly. The bundles 9 of sheets 6 are then placed in position one after the other, straddling the coils 4 between each group of teeth 8 and engaging the steps 15 on the conical portion of the rings 17. Between each bundle 9 of sheets 6 are inserted the wedges 13, in the space previously defined. The bunches 10, previously protected by an insulating sheath are then placed in position from outside, and then the whole assembly is jacketed by the flat sheet rings 12, previously mounted and fixed in the frame 2. At this stage of the assembly it is sufficient to tighten the screws 18, which serve to clamp the assembly by bearing against the end teeth 8, thus spacing in extension the sheets 6 against the crossing sheets 12 and thus at the same time effecting the final assembly of the stator and achieving close mutual contact between the longitudinal magnetic elements and the annular stack serving as the magnetic sleeve.

All that remains to be done is to withdraw the assembly mandrel, possibly bore or grind the interior of the stator, and to place in position the armature and the ball corridor bearings 3.

The Applicants have found that the efficiency of the motor can be increased by providing an external coating of electrolytic copper on the soft iron armature tube 1, and that it is advantageous for this coating to be protected by a coating of hard chromium over a supporting layer of nickel.

One advantage that has not yet been described which is possessed by the motor of the invention is that the armature 1 can be mounted on fluid-tight bearings for low peripheral or translational speeds, thus permitting it to be filled with ferrofluid or a heat-bearing fluid of any kind in order to improve its power-to-weight ratio.

In FIGS. 3 and 4 the reference numeral 31 designates a billet or bloom in the course of continuous casting from an ingot mould. A crust 32 of solidified metal forms a solidification well whose thickness increases in the casting direction F; the liquid metal 33 forms a liquid well which is subjected to stirring by means of an electromagnetic field generated by the inductor of the invention, which is of the same general construction as that shown in FIGS. 1 and 2 and which is designed to generate a field of helicoidal movement, so that a circulation of liquid metal is established in the solidification well.

The magnetic circuit is composed of a cylindrical carcass 11 formed of thin annular sheets arranged in a stack and carrying in its bore stacked sheet bars 6 of rectangular section and having an axis parallel to the generatrices of the cylindrical carcass 11. These bars 6 are provided with teeth 8, in the notches of which are disposed the coils of a winding generating a sliding field, for example in the form of circular coils 4. The bars 6 are held in position circumferentially in slots 22 formed in the bore of the cylindrical carcass 11, and radially as in the example shown in FIG. 1. Between the bars 6 are disposed the bunches 10 of the winding producing a rotating field.

The sliding field and rotating field windings are polyphase windings and supplied with industrial frequency (50 or 60 Hz) or reduced frequency. The stator assembly can be placed in a toroidal casing, through which preferably passes a current of cooling water, as is known per se.

In the above description nothing has been said of an electric wiring diagram. It is clear that the invention makes it possible for two inductors of asynchronous polyphase motors to be formed in one and the same stator, one being linear and the other rotary, and that the respective connections of the tubular winding and of the undulating winding bunches may be made in a fixed or switchable manner, simultaneously or separately in accordance with all known circuit arrangements.

We claim:

1. A tubular stator capable of creating a magnetic field having a linear component and a rotary component, comprising:

a tubular magnetic frame divided into longitudinal magnetic elements spaced angularly apart at least peripherally and having a comb-like radial profile whose teeth are directed radially towards the centre, a tubular winding having circular induction coils which are disposed between the teeth of the longitudinal magnetic elements, undulating coil bunches disposed longitudinally between the longitudinal magnetic elements and surrounding the circular induction coils, and a magnetic sleeve surrounding the magnetic frame.

2. A stator according to claim 1, in which each longitudinal magnetic element is composed of a laminated stack of comb-like sheets.

3. A stator according to claim 1, in which the magnetic sleeve is composed of a laminated stack of flat sheets in the form of annular discs.

4. A stator according to claim 1, in which the longitudinal magnetic elements are spaced angularly apart from one another by means of non-magnetic wedges disposed in the spaces bounded circularly by the teeth of two successive longitudinal magnetic elements, radially by an air-gap and bunches of the winding comprising the longitudinal bunches, and longitudinally by two successive coils of the tubular winding.

5. A stator according to claim 1, in which the longitudinal magnetic elements and the sleeve are in close mutual contact.

6. A stator according to claim 1 or 5, in which the longitudinal magnetic elements are assembled together by clamping in radial expansion against the magnetic sleeve.

7. A stator according to claim 6, in which the radial expansion clamping is achieved by providing each end of each longitudinal magnetic element with a step having an inner face or edge directed outwardly towards a point situated on the extension of the axis of the stator, all the steps at the same end being circularly mounted on a frustoconical ring, and the frustoconical ring being provided with means for pushing apart the end teeth of the longitudinal magnetic elements.

8. An electric motor having both rotary and linear movement comprising a cylindrical rotor freely slidable in the centre of a tubular inductor, the said tubular inductor comprising:

a tubular magnetic frame divided into longitudinal magnetic elements spaced angularly apart at least peripherally and having a comb-like radial profile whose teeth are directed radially towards the centre, a tubular winding having circular induction coils which are disposed between the teeth of the longitudinal magnetic elements, undulating coil bunches disposed longitudinally between the longitudinal magnetic elements and surrounding the circular induction coils, and a magnetic sleeve surrounding the magnetic frame.

9. A motor according to claim 8, in which the rotor is covered on its outer surface with a deposit of copper.

10. A motor according to claim 9, in which the deposit of copper is protected externally by a hard coating.

11. A motor according to claim 9, in which the rotor is a tube of soft iron.

* * * * *